Nov. 21, 1950

R. P. DIMMER 2,530,815

MOBILE RADIO TELEPHONE SYSTEM HAVING A SINGLE CHANNEL AND A SINGLE FREQUENCY

Filed Feb. 2, 1949

5 Sheets-Sheet 1

INVENTOR.
ROBERT P. DIMMER

BY [signature]

ATTORNEY

Nov. 21, 1950

R. P. DIMMER 2,530,815

MOBILE RADIO TELEPHONE SYSTEM HAVING A SINGLE CHANNEL AND A SINGLE FREQUENCY

Filed Feb. 2, 1949

5 Sheets-Sheet 2

INVENTOR.
ROBERT P. DIMMER

BY

Chas. W. Candy

ATTORNEY

Nov. 21, 1950 R. P. DIMMER 2,530,815

MOBILE RADIO TELEPHONE SYSTEM HAVING A SINGLE CHANNEL AND A SINGLE FREQUENCY

Filed Feb. 2, 1949 5 Sheets-Sheet 3

INVENTOR.
ROBERT P. DIMMER

BY *Chas. W. Cardy*

ATTORNEY

Nov. 21, 1950 R. P. DIMMER 2,530,815

MOBILE RADIO TELEPHONE SYSTEM HAVING A SINGLE CHANNEL AND A SINGLE FREQUENCY

Filed Feb. 2, 1949 5 Sheets-Sheet 4

INVENTOR.
ROBERT P. DIMMER

BY Chas. M. Candy

ATTORNEY

INVENTOR.
ROBERT P. DIMMER
BY
Chas. W. Candy
ATTORNEY

Patented Nov. 21, 1950

2,530,815

UNITED STATES PATENT OFFICE 2,530,815

MOBILE RADIOTELEPHONE SYSTEM HAVING A SINGLE CHANNEL AND A SINGLE FREQUENCY

Robert P. Dimmer, Chicago, Ill., assignor to Automatic Electric Laboratories, Inc., Chicago, Ill., a corporation of Delaware Application February 2, 1949, Serial No. 74,134

16 Claims. (Cl. 250—6)

The present invention relates to automatic telephone systems in general, and more particularly to an urban mobile radio telephone system in which a fixed, or radio station is the medium for interconnecting calling and called subscriber substations, and, in which the connection comprises both mobile (isolated) and exchange connected subscribers.

It is a principal object of the invention to provide an urban mobile radio telephone system of a type that is simple and economical in design, yet easy, reliable and efficient in operation.

A further and more specific object is to provide improved automatic dial-to-dial operation between mobile and exchange subscribers, and vice versa, by means of the fixed, or radio station equipment, without the intervention of an operator.

A feature of the invention resides in the provision of equipment at each mobile unit for releasing the radio station equipment which is under control of the mobile subscriber, and in which a timed release pulse is sent over the mobile unit's carrier responsive to the replacing of the handset on its switchhook. This incoming pulse is received at the radio station and effectively initiates the release of the radio station equipment for handling other calls within a short period of time after the mobile subscriber has broken the connection, thereby eliminating needless waste of time.

Another feature resides in the provision of a pulse receiver at each mobile unit having a minor switch including a single level of bank contacts, and which is operated responsive to incoming pulses for identifying the call for a mobile unit and to subsequently signal the mobile subscriber only when a call is intended for him.

The invention, both as to its organization and method of operation together with further objects and advantages thereof, will best be understood by reference to the specification taken in connection with the accompanying drawings in which.

The instant disclosure shows a single channel system providing complete secret service, full selective ringing, dial tone, busy tone, ring-back tone and answer signals in both directions.

The radio frequency carrier transmitted from the transmitter at the control station and the radio frequency carrier transmitted from the transmitters at the mobile stations are modulated by a 3000 cycle voltage by the tone oscillators at the mobile and control stations for transmitting impulses, while the tone detectors connected to the receivers at these stations detect these pulse modulations for translation into switch controlling pulses.

When a call is originated by an exchange subscriber who desires to call a mobile subscriber, a special first digit is dialed, subsequent to the receipt of the usual first dial tone received from the first numerical switch in the automatic switch train, for connecting him with a "radio" level in the selector of the automatic exchange. The remaining two digits of the mobile subscriber's call number are then dialed subsequent to the receipt of a second dial tone which indicates readiness to receive dial impulses for controlling the transmission of radio impulses. It will be noted that the bank contacts of the minor switches in the mobile stations are wired according to each mobile station's individual call number, and that the call number of the mobile station shown (Figs. 3 and 4) is the two digit number "47," while the remaining contacts, with the exception of the first contact (1) and the last contact (0), are connected in multiple.

A general call feature is provided in the minor switch 405 in which if it is desired to signal all the mobile subscribers simultaneously, the operator at the central office exchange may dial the single digit (0) which operates the minor switch at each mobile station for signalling the station's subscribers.

Having briefly described the apparatus involved in each figure and the various features and objects, a more detailed description of the equipment and its operation under different conditions will follow.

*Telephone office switching equipment*

Figure 1:
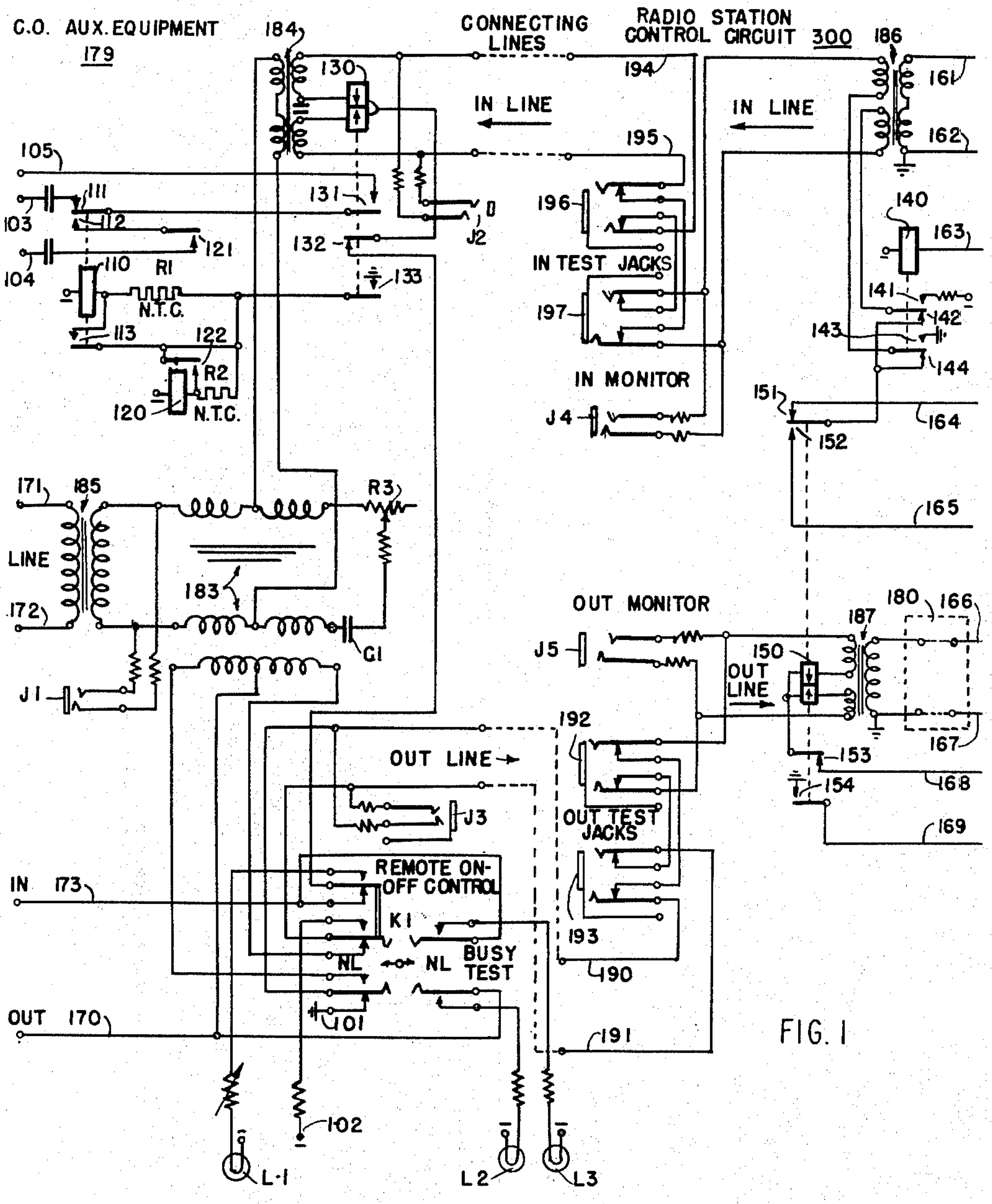
Figure 1 shows a part of the central office auxiliary equipment located in an automatic telephone exchange, part of the radio station control circuit, test equipment and connecting lines between the central office auxiliary equipment and the radio station control circuit.

Figures 1A and 1B of the copending application, Serial No. 55,627, filed October 20, 1948, of R. H. Herrick, shows automatic switching equipment in the telephone office which can be applied to the present application for completing this disclosure by connecting the four conductors 170, 171, 172 and 173 of Fig. 1B to conductors 170, 171, 172 and 173 in Fig. 1 (Central Office Auxiliary Equipment) of the present application. The descriptions and explanations in the specification of the above-mentioned copending application concerning the arrangement and operation of the automatic switching equipment shown in Figs. 1A and 1B can, consequently, be read as though such description and explanation were a part of the specification in the present application.

*Telephone office auxiliary equipment*

Figure 1 shows the Central Office Auxiliary Equipment connecting the Automatic Switching Equipment (Fig. 1A, 1B of the mentioned copending application) in the Central Office to the Radio Station Control Circuit 300. This auxiliary equipment is usually located in the telephone exchange building but may be located at a remote point if circumstances so require. The automatic switching equipment is connected to the auxiliary equipment by talking conductors 171 and 172, and by "Out" line simplex signalling conductor 170 and "In" line simplex signalling conductor 173. The auxiliary equipment is connected to the radio station control circuit 300 by conductors 190 and 191 which constitute the "Out" line conductors, and by conductors 194 and 195 which constitute the "In" line talking conductors.

The auxiliary equipment comprises essentially a hybrid transformer 183 and an associated balancing network consisting of an adjustable resistor R—3 and a capacitor C—1. The hybrid transformer 183 serves to effect the separation of incoming and outgoing voice currents as necessitated by the inherent one way characteristics of the radio transmitter and receiver. The talking conductors 171 and 172 from the automatic switching equipment extend to the left-hand winding of repeating coil 185, with similar talking conductors from the right-hand winding of repeating coil 185 extending to the upper and center windings of transformer 183. It will be noted at this point, that voice currents from the automatic telephone office over conductors 171 and 172 are induced in the lower windings of transformer 183. Talking conductors are extended from the outer terminals of the lower windings of the transformer 183 through normally closed contacts of key K—1 to conductors 190 and 191 which constitute the "Out" line talking circuit to the radio station control circuit 300. The "Out" line simplex signalling conductor 170 from the automatic switching equipment extends to the center tap of the lower winding of transformer 183. Conductors 194 and 195 comprising the "In" line talking circuit from the radio station control circuit 300 extend to the right-hand windings of repeating coil 184, and at this point, voice currents from the radio station over conductors 194 and 195 are induced into the left-hand windings of repeating coil 184. The talking conductors from the "In" line talking circuit are now extended from the outer terminals of the left-hand windings of repeating coil 184 to the center taps of the upper and center windings of transformer 183, through the left-hand upper and center windings to the right-hand winding of repeating coil 185, then from the left-hand winding to conductors 171 and 172, to the automatic switching equipment. The "In" line simplex signalling conductor 173 extends to the inner terminals of the right-hand windings of repeating coil 184 through normally closed contacts of key K—1, contacts 132 and the two windings of relay 130. The "Out" line simplex signalling conductor extends to the center tap of the lower winding of transformer 183.

The auxiliary equipment also includes a timing arrangement for controlling the connection of simulated "second" dialing tone and simulated ring-back tones on calls outgoing from the telephone office to a mobile unit. In addition to relay 130 this timing arrangement includes relays 110 and 120 and their associated temperature sensitive resistors R—1 and R—2, which function in a manner to be described later in this specification. Continuous ringing voltage is supplied from the automatic switching equipment over conductor 103 for connection through contacts 131 of relay 130 and conductor 105 to the calling line. While interrupted ringing voltage is supplied over conductor 104 for connection through contacts 121, 112, 131 and conductor 105 to the calling line.

Monitor jacks connected to the talking conductors of the auxiliary equipment provide means for monitoring calls between the telephone office and the mobile units. Jack J—1 is bridged across the talking conductors extending from the right-hand winding of repeating coil 185; jack J—2 is bridged across the "In" line talking conductors from the radio station; and jack J—3 is bridged across the "Out" line talking conductors to the radio station. All three jacks are connected with suitable resistors in each conductor to maintain line balance and to prevent appreciable effect on an established conversation when the monitor equipment (not shown) is connected to any one of the monitor jacks.

A test key K—1 comprising two sections is also incorporated in the auxiliary equipment. The right-hand section of the key K—1 provides facilities for determining whether or not there is a busy connection established between the telephone office and one of the mobile units. The left-hand section of the key K—1 provides means for turning the equipment of radio station control circuit 300 "On" or "Off," as the case may be.

*Radio station control equipment*

Figure 2:
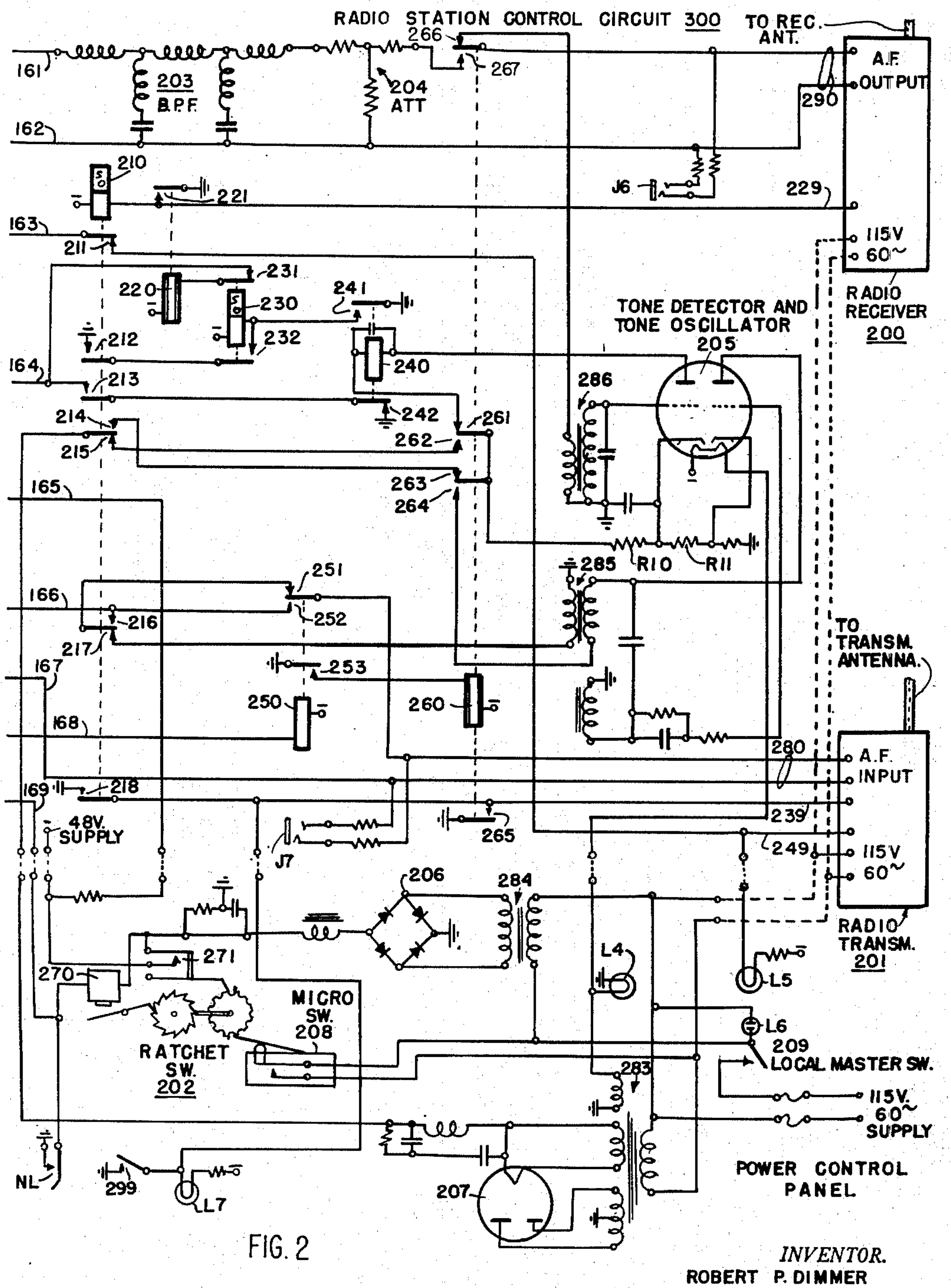
Figure 2 shows the remainder of the radio station control circuit, the radio receiver and the radio transmitter and the power control panel.
Figure 3:
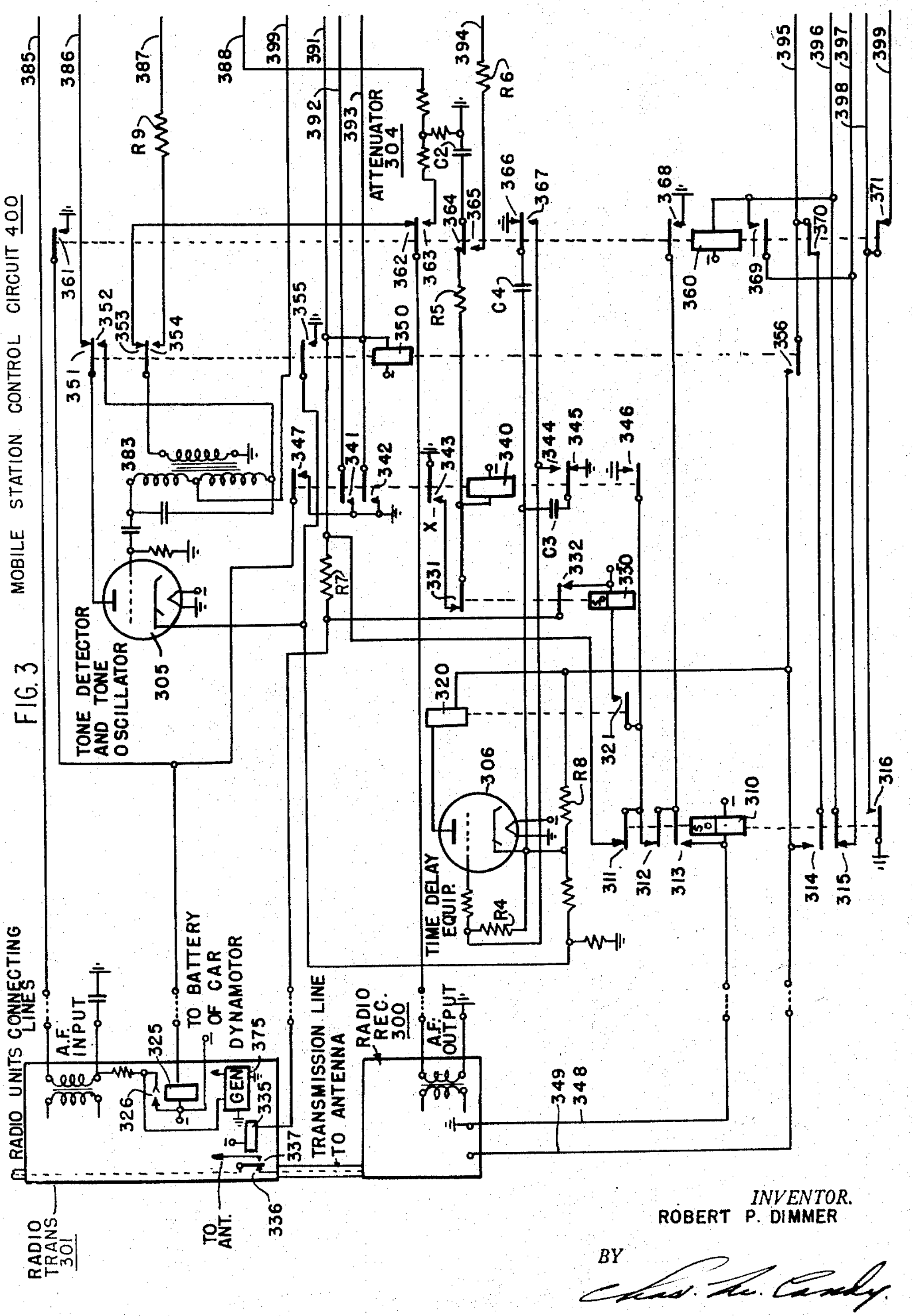
Figure 3 shows the radio receiver, transmitter, and antenna and part of the mobile station control circuit of a mobile unit.
Figure 4:
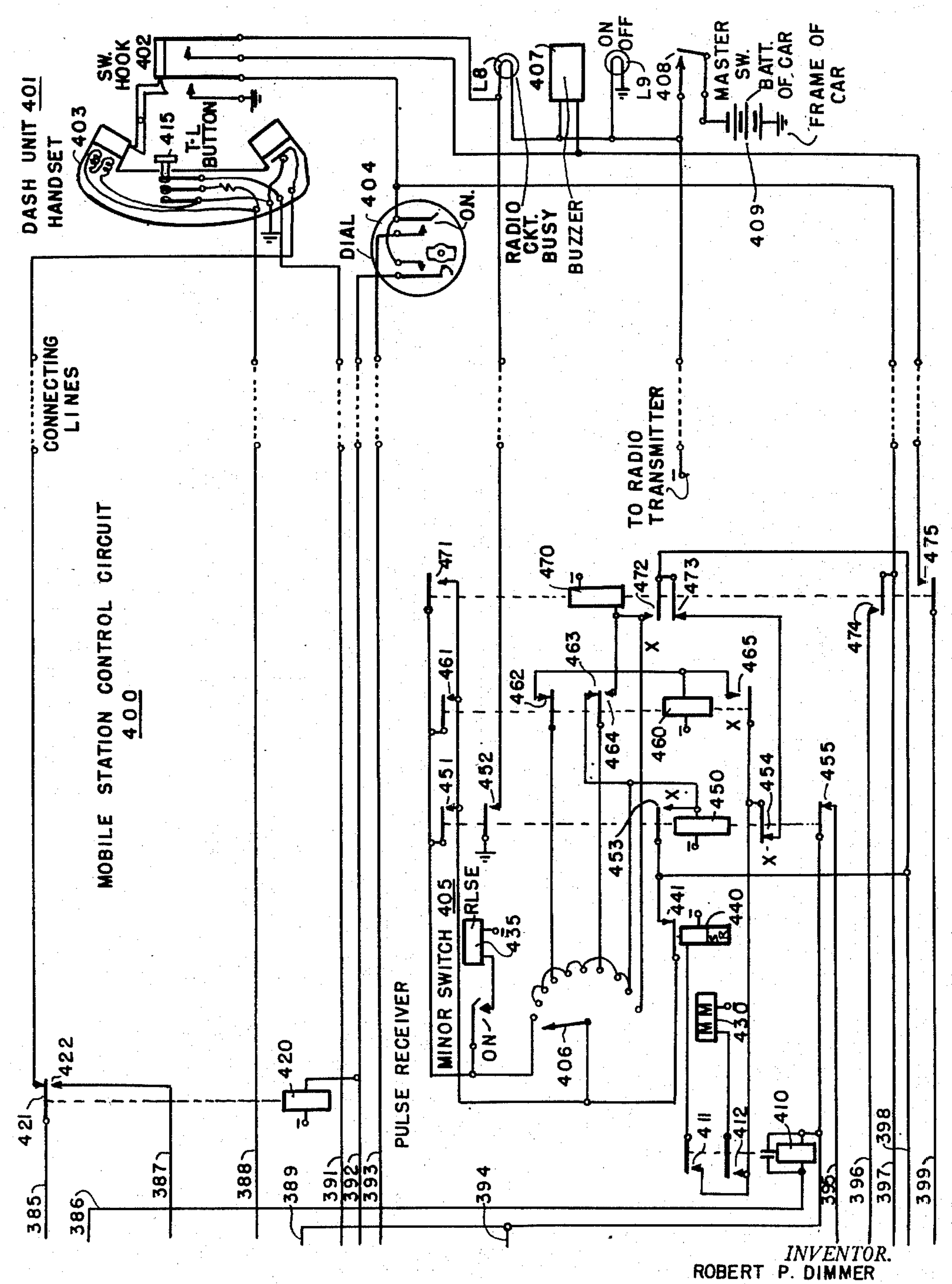
Figure 4 shows the remainder of the mobile station control circuit, the pulse receiver, and the dash unit.

The right-hand portion of Fig. 1 and all of Fig. 2 show the arrangement of the Radio Station control circuit 300. This equipment interconnects the automatic switching equipment (Figs. 1A and 1B of the aforementioned copending application) in the telephone exchange and the mobile units (such as illustrated in Figs. 3 and 4) by way of the auxiliary equipment (Fig. 1) in the telephone exchange and transmitter 201 and receiver 200 (Fig. 2) at the radio station. The auxiliary equipment (Fig. 1) is connected to the radio station control circuits by conductors 190 and 191 which constitute the "Out" line talking conductors, and by conductors 194 and 195 which constitute the "In" line talking conductors.

An "Out" line simplex signalling conductor 170 is connected to the center tap of the lower winding of repeating coil 183, through the extreme left and right conductors from the lower winding of coil 183, contacts of key K—1, contacts of jacks 192 and 193, and the two windings of relay 150 to the impulsing, or line, relay 250. Relay 250 is operated from the automatic switching equipment over "Out" line simplex conductor 170 for causing the radio station transmitter 201 to be placed on the air, and for connecting the output circuit of tone oscillator 205 to the transmitter 201, all in a manner to be explained in detail later in this specification.

An "In" line simplex signalling conductor 173 extends through contacts of key K—1, both windings of relay 130, both right-hand windings of repeating coil 184, contacts of test jacks 196 and 197, both left-hand windings of repeating coil 186, contacts of relays 140, 150, and 210, and to ground at contacts of relay 240 which is controlled by tone detector 205. The operation of the "In" line simplex signalling circuit will be explained in detail later in this specification.

Radio station transmitter 201 cooperates with radio receivers 300 of the mobile units by means of a radio frequency carrier. Radio transmitters 301 of the mobile units 400 transmit a radio frequency carrier for operation with radio station receiver 200. The audio frequencies incoming to radio station receiver 200 from a mobile unit pass over "In" line circuit 290, attenuator 204, band pass filter 203, and repeating coil 186 to "In" line talking conductors 194 and 195 leading to the telephone office auxiliary equipment. The attenuator 204 permits adjustment of the radio station receiver output to the relatively high level required (approximately 50 milliwatts) for positive operation of tone detector 205, and also to deliver the normal level of approximately 20 milliwatts maximum to the "In" line circuit. Band pass filter 203 provides means for rejecting noise and other frequencies below 300 and above 2600 cycle to improve the overall signal-to-voice ratio of the circuit.

Monitor jacks connected to the talking conductors of the radio station control circuit provide means for monitoring calls between the telephone office and the mobile units. Jack J—6 is bridged across the "In" line talking conductors from the radio station receiver 200; jack J—4 is bridged across the "In" across line talking conductors from the auxiliary equipment just ahead of the simplex transformer 183. Jack J—5 is bridged across the "Out" line talking conductor from the auxiliary equipment just ahead of simplex transformer 183; and jack J—7 is bridged across the "Out" line talking conductors to the radio station transmitter 201 beyond simplex transformer 183 for monitoring the radio station transmitter modulation input. All four jacks are connected with suitable resistors in each conductor to maintain line balance and to prevent appreciable effect on an established conversation when the monitor equipment (not shown) is connected to any one of the monitor jacks.

The radio station control circuit 300 also includes cut-off jacks for "splitting" the "In" line circuit and the "Out" line circuit for testing or like purposes. The insertion of a plug (not shown) into jack 196 splits the "In" line circuit towards the auxiliary equipment, while the insertion of a plug (not shown) into jack 197 splits the "In" circuit towards the radio system. The insertion of a plug (not shown) into jack 193 splits the "Out" line circuit towards the auxiliary equipment, and the insertion of a plug (not shown) into jack 192 splits the "Out" line circuit towards the radio system.

Supervisory lamp signals are incorporated in the radio station control circuit 300 for enabling maintenance personnel at the radio station to note the operating condition of the circuit. One lamp L—7 functions to indicate that radio station transmitter 201 has been started. Another lamp L—5 functions to indicate when the radio station transmitter carrier is on the air, as contrasted with lamp L—7 indicating that transmitter 201 has only been started. The glowing of both lamps simultaneously indicates that transmitter 201 is functioning properly.

Transformer 284 is the only power transformer in the radio station control circuit 300 continuously active, even though the rest of the equipment in control circuit 300 is turned "Off." Transformer 284 can be made inactive only by the operation of master switch 209, which operation disconnects the main alternating current power supply (for example, 115 volts, 60 cycle) to control circuit 300 and thereby render the entire radio station equipment dead. Transformer 284 supplies alternating current to the full-wave rectifier 206, which supplies direct current to the magnet or ratchet switch 202, which controls the radio station equipment "On" or "Off."

Test switch 299 is a facility which permits radio station personnel to start radio transmitter 201 locally. Test switch 289 provides means for the local operation of ratchet switch 202, thereby, to turn the equipment of control circuit 300 "On" or "Off," as the case may be.

Master switch 209 is the facility which places control of all radio station equipment, including transformer 284, in the hands of maintenance personnel primarily for personal safety. By this control, a maintenance man makes the entire radio equipment dead in order to protect himself while working on portions of the equipment which would endanger him if it were unexpectedly energized. Supervisory lamp signal L—6 glows whenever master switch 209 is in the operated position.

Control circuit 300 further includes a source of 48 volt direct current and of 250 volt direct current. The 48 volts direct current supply may be derived from a 115 volt alternating current supply through a conventional dry-disc rectifier 206 with an inductive input type of smoothing filter. The 48 volt direct current thus made available is utilized for operating the relays at the radio station and certain of the supervisory lamp signals. The 250 volt direct current supply is derived through a conventional tube rectifier 207 using a type 5Y3GT/G vacuum tube with small capacity input type of filter from the 115 volt alternating current supply. The 250 volt direct current thus made available is used for the anodes of tone detector and tone oscillator 205. A winding of transformer 283 supplies the heater of tube 205, one section of which acts as a tone detector and the other section which acts as a tone oscillator.

Separate fuses (not shown) are also provided for the various power supplies of the radio station control circuit 300.

*Mobile station control equipment*

Figures 3 and 4 show the arrangement of the mobile station control equipment. All of this equipment is located in the mobile unit and is suitably mounted therein. The mobile station control equipment may be sub-divided into the dash unit 401, the mobile station control circuit 400 and the radio units 300 and 301. It will be noted that the positive terminal of the battery 409 is connected to the frame of the car and that all ground symbols shown in the drawing are also connected to the frame of the car.

The radio units comprise mainly of a well-known radio receiver 300 and a well-known radio transmitter 301. It will be noted that both the receiver 300 and transmitter 301 use the same antenna (not shown) for receiving and sending the carrier frequencies. The talk-listen relay 335 in the transmitter 301 is provided for switching the antenna from the receiver to the transmitter and then from the transmitter to the receiver responsive to the depression and restoration of a talk-listen button 415 in the handset 403. A dynamotor 375 in the transmitter is operated by the relay 325 whenever the handset 403 is removed from the switchhook 402 for providing power for the transmitter 301 and for the handset 403.

The dash unit 401 is comprised mainly of handset 403, switchhook springs 402, dial 404, buzzer 407, master switch 408 and indicator lamps L—8 and L—9. Handset 403 contains a talk-listen button 415 which is depressed during talking and released during listening.

The mobile station control circuit 400 is comprised mainly of vacuum tubes 305 and 306, minor switch 405, attenuator 304, and the necessary relays, transformers, conductors, resistors and condensers. Tube 305 has two separate and distinct functions: one is to operate as a detector for rectifying incoming pulses from a calling line for operating minor switch 405, and the other is to operate as an oscillator for providing 3,000 cycle voltage which is later controlled responsive to dialing and sent to the transmitter 301 as splashes of tone pulses. Minor switch 405 is shown as a rotary switch having a single level of bank contacts, with the bank contacts being wired according to each mobile units' individual call number (which in Fig. 4 is shown to be the number 47). Attenuator 304 is provided for permitting adjustment of the radio station receiver 300 power output to a relatively high level (approximately ½ watt) for operation of tube 305, and also to deliver a normal level of power for the handset 403 (approximately 6 milli-watts).

When an incoming call (via the fixed radio station equipment) is initiated, the carrier received from the radio station transmitter 201 causes squelch relay 310 to operate and prepare the mobile equipment for receiving the call. Tube 305, which acts as a tone detector, is operated on incoming pulses of tone from the fixed station and rectifies these pulses for operating relay 410. Relay 410 causes the stepping operation of minor switch 405. The first digit of the car's call number is dialed and relay 410 pulses correspondingly for causing motor-magnet 430 to step wiper 406 of the minor switch 405 to a contact corresponding to the first digit dialed. The minor switch 405 then restores between digits and after restoration, when the second digit is dialed, motor-magnet 430 again positions wiper 406 accordingly, at which time relay 470 is operated to signal the called mobile subscriber of an incoming call.

When an outgoing call (from the mobile unit) is initiated, the transmitter 301 is connected with the antenna and the car's carrier is put on the air for approximately two seconds for starting the fixed station's equipment to seize a line in the central office. The time delay equipment including tube 306 operates which disconnects the transmitter 301 from the antenna and connects receiver 300 to the antenna. Dial tone from the automatic exchange modulates the carrier from the fixed station which is then received and sent to the handset via receiver 300. Tube 305 was changed to operate as an oscillator in response to the removal of the handset, and in response to the operation of the dial transmits a 3,000 cycle dial controlled voltage to the transmitter which sends these pulses to the fixed station. The automatic equipment at the central office operates in the usual manner and the call is completed as a regular telephone call.

*Outgoing call (exchange subscriber via fixed station to mobile subscriber)*

The operation of the fixed, or radio station equipment during an outgoing call from an exchange subscriber to a mobile subscriber will now be explained, reference being had to Figs. 1 and 2.

It will be assumed that the subscriber at station T (Fig. 1A of the aforementioned copending application) has originated the call by removing his receiver, and that the equipment at the automatic exchange (Figs. 1A and 1B of the aforementioned application) has operated and transmitted a first dial tone back to subscriber T in the usual manner.

It will also be assumed that the radio station equipment has been energized and has been made ready for handling both incoming and outgoing calls in the following manner. The operator at the radio station closes local master switch 209 which supplies 115 volt 60 cycle power to transformer 284. The wire chief at the central office auxiliary equipment station (Fig. 1) momentarily operates key K—1, thereby energizing relay 150 over a circuit from battery at 102, through operated contacts at key K—1, over the "Out" line conductor 190, through (normally) closed contacts of test jacks 193 and 192, the lower left-hand winding of repeating coil 187, the lower winding of relay 150, the upper winding of relay 150, the upper left-hand winding of repeating coil 187, the normally closed contacts of test jacks 192 and 193, the "Out" line conductor 190 and the operated contacts of key K—1 to ground at 101. The flow of current through both windings of relay 150 is in an aiding direction to operated relay 150. In operating, relay 150 opens the energizing circuit of relay 250 at contacts 153, and at contacts 154 completes a circuit for operating magnet 270 of the ratchet switch 202. This circuit may be traced from ground at contacts 154, conductor 169, winding of magnet 270 to negative battery at rectifier 206. Key K—1 is returned to normal and relay 150 is deenergized. At contacts 154, relay 150 opens the circuit to magnet 270. It will be noted that when magnet 270 was energized it attracted its armature and held it in that position. As magnet 270 restores, the spring action against the armature causes the ratchet switch 202 to step one step. Ratchet switch 202, thus closes the contacts in the micro-switch 208 which now completes the energizing circuit for the ratio station control equipment 300. Thereby, power is supplied to the transformer 283, the radio receiver 200, radio transmitter 201, filaments of tube 205, relays and indicating lamps. At contacts 271, ratchet switch 202 supplies 48 volt battery supply from rectifier 206 to all the relays.

When the exchange subscriber T receives the first dial tone as an indication for dialing, he then dials a certain specified first digit of the desired call number. Responsive to the certain first digit being dialed, the automatic exchange equipment operates in the usual manner and a "radio" level of the central office selector switch is reached, at which time a ground potential is subsequently placed on the "Out" simplex line conductor 170.

The ground on the "Out" simplex conductor 170 completes a circuit for energizing relay 250 through both windings of differential relay 150 in parallel. This circuit may be traced as follows: from grounded simplex "Out" conductor 170 to the center tap of the lower winding of transformer 183 where the circuit then extends over two branches in parallel including the left and right-hand lower windings of transformer 183, normally closed contacts of key K—1, conductors 190 and 191, normally closed contacts of the test jacks 193 and 192, upper and lower left-hand winding of repeating coil 187, through the upper and lower windings of differential relay 150, where these parallel circuits join and extend by way of contacts 153 and the winding of relay 250 to battery. The current flow through windings of differential relay 150, at this time, are in opposing directions with the result the two windings oppose each other and the relay does not operate its armature. Relay 250, however, is operated over this "simplex" circuit.

In operating, relay 250 completes an obvious circuit to relay 260 at contacts 253, and at contacts 252 completes a point in the outgoing line 280 to the transmitter 201. Relay 260 (which is slow to release) remains operated during dialing. At contacts 262 and 264, relay 260 completes the plate circuit for tube 205 to operate as a tone oscillator. At contacts 265, relay 260 supplies a starting ground potential for placing transmitter 201 on the air. Responsive to the radio transmitter being started, a circuit is completed for operating relay 140 by placing ground on conductor 249 in the transmitter. This circuit may be traced from ground in transmitter 201 over conductor 249, contacts 211, conductor 163 and through the winding of relay 140 to battery.

In operating, relay 140 completes a circuit for relay 130 at contacts 141 and 143. The circuit for energizing relay 130 may be traced from ground at contacts 143, the upper left-hand winding of repeating coil 186, the normally closed contacts of test jacks 197 and 196, conductor 194 of the "In" line, upper right-hand winding of repeating coil 184, the upper winding of relay 130, the lower winding of relay 130, the lower right-hand winding of repeating coil 184, conductor 195 of the "In" line, normally closed contacts of test jacks 196 and 197, the lower left-hand winding of repeating coil 186 and to battery through contacts 141. The two windings of relay 130, being connected in series, aid each other with the result that relay 130 operates in response to the operation of relay 140.

In operating contacts 131, relay 130 completes a second dial tone circuit back to the calling line over conductor 105 from the tone source connected to conductor 103. At contacts 132, relay 130 opens a point in the "In" line simplex signalling circuit, and at contacts 133 completes a circuit for the relays 110 and 120. The circuit for relay 110 may be traced from ground at contacts 133, temperature sensitive resistor R—1 and through the winding of relay 110 to battery. The circuit for relay 120 may be traced from ground at contacts 133, down through temperature sensitive resistor R—2 and through the winding of relay 120 to battery. Approximately five seconds after the circuit to relay 110 is completed, the resistance of R—1 has decreased sufficiently to allow enough current to flow for relay 110 to operate. At contacts 111, relay 110 removes second dial tone from the calling line, at contacts 112 prepares a point for connecting interrupted ringing current on conductor 104 to the calling line, and at contacts 113, relay 110 completes a locking circuit for itself. Approximately five seconds after relay 110 has operated, the resistance of R—2 has sufficiently decreased to allow enough current to flow for relay 120 to operate. At contacts 121, relay 120 applies interrupted ring-back current to the exchange subscriber which continues until the call is answered, and at contacts 122, relay 120 completes a locking circuit for itself.

Upon receipt of the second dial tone, the exchange subscriber dials the remaining digits of the call number. Pulses corresponding to the next digit dialed are transmitted to the pulse relay 250 which restores a number of times corresponding to the number of pulses transmitted. Upon each release of relay 250 at contacts 251, dial pulses are converted to corresponding splashes of tone of about 3,000 cycles and are sent to the radio transmitter 201 over the outgoing line 280. Since the tone oscillator part of tube 205 is now operating, the anode-cathode circuit output of the tube is applied to the primary winding of transformer 285. The secondary winding of transformer 285 sends the tone oscillations to the outgoing line 280 by way of contacts 217 and are converted to splashes of tone at contacts 251 by relay 250.

The tone splashes corresponding to dial pulses are sent over the outgoing line 280 by the pulsing relay 250 to modulate the radio station's carrier and these modulations are received at the mobile unit in a manner to be explained later. Responsive to dialing the last digit of the call number, corresponding pulses of tone again modulate the carrier and are transmitted to the mobile unit in a similar manner.

Upon completion of dialing, the mobile equipment operates to signal the mobile subscriber of an incoming call. Upon answering by the mobile subscriber, a carrier from the mobile unit is received at radio receiver 200. When the carrier is received at radio receiver 200, a ground is applied to conductor 229 for operating squelch relay 210 over an obvious circuit.

Upon operating, squelch relay 210 opens the circuit to relay 140 at contacts 211; at contacts 212 prepares a locking circuit for relay 230; at contacts 213 completes a circuit for relay 220 which may be traced from ground at contacts 242, contacts 213, up to contacts 231 and through the winding of relay 220 to battery. At contacts 216 squelch relay 210 prepares a point in the talking conductors of the outgoing line 280, at contacts 217 the output of the tone oscilllator is removed from the line, and at contacts 218 maintains transmitter 201 energized during conversation. In operating contacts 221, relay 220 completes an obvious locking circuit for squelch relay 210. When relay 140 restores, the energizing circuit for relay 130 is opened at contacts 141 and 143. Relay 130 restores and at contacts 133 opens the locking circuit to relays 110 and 120 which then restore. The tone transmitted from conductor 104 and back to the calling station over conductor 105 is now disconnected.

Conversation may now proceed in the usual manner and upon completion of the conversation and in response to the exchange subscriber hanging up, the circuit is opened to relay 250. As relay 250 restores contacts 253, the circuit to relay 260 is opened. After the mobile subscriber replaces his handset, modulated carrier from the mobile transmitter is automatically placed on the air for a two second duration in order to release the connection.

It will be noted that since squelch relay 210 is still operated, and relay 260 has restored (which then completes the plate circuit at contacts 263 for the tube 205 to operate as a tone detector), the steady two second incoming release pulse of modulated carrier from the mobile unit is rectified by the tone detector of tube 205 and a circuit is completed for operating relay 240 for a two second time interval. This circuit may be traced from the left-hand anode of the tube 205, through the winding of relay 240, contacts 261 and through resistance R—10 to the left-hand cathode of tube 205.

Before continuing with the present operation, it will again be noted that at the time the mobile station's carrier came on the air, relay 210 operated and at contacts 213 completed an obvious circuit for relay 220, which upon operating provided an obvious locking circuit for relay 210 at contact 221. When the two second release pulse was modulated with the mobile station's carrier, the detector part of tube 205 passes current and relay 240 operates as described above. At contacts 241, relay 240 completes a circuit for slow-to-operate relay 230 and at contacts 242 opens the circuit to slow-to-release relay 220. Relay 230 will, however, operate just ahead of the restoration of relay 220 and will lock up over an obvious circuit at contacts 232, and at contacts 231 opens a further point in the circuit to relay 220. Relay 220 now restores and opens the locking circuit of squelch relay 210. At the end of the two second interval (the time of the release pulse), both the carrier and release pulse of the mobile station are removed from the air. The energizing circuits for relays 210 and 240 are therefore opened, and relay 240 will restore just slightly ahead of relay 210. In restoring, relay 240 opens the energizing circuit to relay 230, which however remains operated over its locking circuit. Relay 210 now restores and at contacts 212 opens the locking circuit to relay 230, at contacts 213 opens the "In" line simplex signalling circuit to release the automatic switch train, and at contacts 218 removes the starting potential for radio transmitter 201, which then removes the radio station's carrier from the air. Relay 230 now restores and the radio station is at rest and conditioned for future calls.

*Incoming call (mobile subscriber via fixed station to exchange subscriber)*

The operation of the fixed, or radio station, equipment during an incoming call from a mobile subscriber to an exchange subscriber (or another mobile subscriber) will now be explained, reference being had with Figs. 1 and 2.

It will be assumed that the radio station equipment has been made ready to receive and make calls in the same manner as described under the section entitled "Outgoing Call" and that the mobile subscriber's equipment shown in Figs. 3 and 4 is that of the calling party.

As the mobile subscriber at the mobile unit removes his handset, his radio transmitter is placed on the air for approximately two seconds. It will be noted that as neither relays 250 and 260 are operated, the plate circuit is prepared to the tone detector part of tube 205.

The incoming carrier from the mobile transmitter causes ground potential to be applied to conductor 229, which will operate squelch relay 210. In operating contacts 212, squelch relay 210 prepares a circuit for relay 230. At contacts 213 squelch relay 210 completes the "In" line simplex signalling circuit, and also completes a circuit to relay 220, which may be traced from ground at contacts 242, contacts 213, 231, and through the winding of relay 220 to battery. At contacts 214, squelch relay 210 completes the plate circuit for the tube 205. At contacts 217 the output of the tone oscillator part of tube 205 is opened. At contacts 218, squelch relay 210 applies a ground potential by way of conductor 239 for starting radio transmitter 201. Upon operating, relay 220 completes an obvious locking circuit for the squelch relay 210 at contacts 221.

The starting of radio transmitter 201 (responsive to the closing of contacts 218) causes the radio station's carrier to be placed on the air.

The signal "In" simplex conductor 173 is grounded at contacts 213 by the operation of squelch relay 210 to cause the operation of a relay in the automatic exchange equipment (similar to relay 110 shown in Fig. 1B of the copending Herrick application, Serial No. 55,627, filed October 20, 1948). The circuit for grounding conductor 173 may be traced as follows: grounded contacts 242, contacts 213 to contacts 151 and thence over two parallel paths including contacts 142 and 144, both left-hand windings of repeating coil 186, both "In" line conductors, normally closed contacts on test jacks 197 and 196, conductors 194 and 195, both right-hand windings of repeating coil 184, and through opposing windings on differential relay 130 when the parallel paths again join and extended by way of contacts 132, upper normally contact of key K—1, to the "In" simplex conductor 173 and to the aforementioned relay in the automatic exchange to battery. The relay in the automatic exchange operates, as explained in the copending application to cause seizure of a numerical switch in the automatic exchange. The seizure of this numerical switch causes dial tone to be transmitted back to conductors 171 and 172. This dial tone is transmitted through the coils 185 and 183, over the "Out" line to coil 187 and thence to the radio transmitter over line 280 and superimposed on the carrier for transmission to the mobile station receivers. This carrier operates the mobile station's radio receiver, and responsive to dial tone being transmitted to the radio transmitter from the regular automatic exchange via the "Out" line, the mobile subscriber is informed that dialing may be started.

The modulated carrier dial pulses from the mobile subscriber's radio transmitter 301 are received by radio receiver 200 and sent over the "In" line 290 and applied through transformer 286 to the grid of the detector part of tube 205 and are rectified therein. The rectified pulses operate relay 240, once for each pulse, over a circuit from the plate of the detector, relay 240, contacts 261, and resistance R—10 to the filament of the detector part of tube 205.

In operating, relay 240 completes an obvious circuit for relay 230 at contacts 241. At contacts 242, relay 240 transmits these pulses over the "In" line signalling circuit to the automatic exchange.

The pulses received at the automatic exchange operate a relay which repeats loop pulses to operate the automatic switches to extend the call to the called automatic subscriber in the well-known manner. Upon completion of dialing, the mobile subscriber receives a ring-back tone, when the called party is being rung, from the regular exchange in the usual way, via the "Out" line conductors 190 and 191, through the repeating coil 187, the "Out" line 280 to radio transmitter 201, and hence to the mobile station.

Relay 230 is a slow-to-operate relay and will not operate during dialing because the ground pulses at contacts 241 are of too short a duration. Relay 230 is only operated on the long "release" pulse. When the called automatic subscriber answers by removing his receiver, relay 250 is operated from a ground potential placed on the "Out" signalling conductor 170 from the automatic exchange over a circuit previously traced.

In operating contacts 252, relay 250 completes a point in the circuit of the "Out" line 280. At contacts 253, relay 250 completes an obvious circuit for relay 260. At contacts 261, relay 260 opens the plate circuit of the detector part of the tube 205 and at contacts 265, relay 260 maintains the radio transmitter 201 energized.

Conversation now proceeds in the usual manner, and upon completion, the hanging up of the exchange subscriber opens the circuit to release relay 250, which in turn releases relay 260. In restoring contacts 263, relay 260 again completes a point in the plate circuit of the tone detector part of tube 205, and at contacts 265 removes one of the starting grounds for radio transmitter 201. When the mobile subscriber replaces his handset, a release pulse of modulated carrier from the mobile transmitter is placed on the air for approximately two seconds, and since squelch relay 210 is operated and relay 260 has restored, the tone detector part of tube 205 is again operable. In which case, upon receipt of the two second continuous release pulse from the mobile transmitter, tube 205 rectifies this pulse and passes a steady current for operating relay 240 over a previously traced circuit.

In operating contacts 241, relay 240 completes an energizing circuit for a time duration sufficient to operate relay 230. In operating, relay 230 locks up at contacts 232 and at contacts 231 opens the circuit for relay 220.

The restoring of slow-to-release relay 220 opens the locking circuit for relay 210 at contacts 221. When squelch relay 210 restores, on termination of the carrier, the locking circuit for relay 230 is opened at contacts 212. In restoring contacts 213, squelch relay 210 opens the "In" line simplex signalling circuit to release the automatic switch train, and at contacts 218 removes the starting potential for radio transmitter 201, which then removes the radio station's carrier from the air.

The radio station control equipment is now at rest and conditioned for future calls.

*Outgoing call from mobile subscriber*

The operation of the mobile equipment during the origination and completion of an outgoing call from one of the mobile units will now be explained, reference being had with Figs. 3 and 4 of the drawings.

It will be assumed that the mobile unit subscriber has energized his equipment by closing the master switch 408 which supplies power for the equipment from battery 409. It will be noted that the positive terminal of battery 409 is connected to the frame of the car and that all the ground symbols shown are likewise connected to the frame of the car.

In order to initiate an outgoing call, the mobile subscriber removes his hand-set 403 from the switch hook. As soon as hand-set 403 is removed from the switch hook a circuit is completed for relay 360, with this circuit being traced from the grounded contact at switch hook springs 402, conductor 397, contacts 315, up from conductor 396 and through the winding of relay 360 to battery. In operating contacts 361, relay 360 completes an obvious circuit for the relay 325 in the radio transmitter 301. At contacts 363, relay 360 completes a point in the talking circuit from radio receiver 300 to the hand-set 403. At contacts 365, a point in the charging circuit for the condenser C2 is prepared. At this time it will be noted that when the master switch 408 was closed, a circuit (not shown) was completed to a vibrator (not shown) of the well-known type, in the radio receiver 300, which supplies the high positive (+180 v.) potential to the plate circuits of tubes 305 and 306 and for charging condensers C2, C3 and C4. The plate circuit for tube 305 and condenser C2, however, is at present still open at contacts 356. The plate circuit for tube 306 is completed, as soon as the high potential is supplied, over a circuit including conductor 349 through the winding of relay 320 to the plate of tube 306. The potential to the cathode of tube 306 may be traced from conductor 349 and through resistor R8 to the cathode. Tube 306 now passes current and energizes relay 320, which prepares a point in the energizing circuit to relay 330. The charging circuit for condensers C3 and C4 may be traced from the positive 180 v. source in radio receiver 300, conductor 349, up through resistor R8, up and to the right and to the upper and left-hand plates of condensers C3 and C4 respectively. Ground potential is supplied to the lower and right-hand plates of condensers C3 and C4 by way of contacts 345 and 366 respectively. To continue with the present operation of relay 360—at contacts 367 the discharge circuit of condenser C4 in the timing circuit of the time delay tube 306 is completed. This discharge circuit may be traced from the left-hand plate of condenser C4 through resistance R4, contacts 367 and to the right-hand plate of condenser C4. At contacts 368, relay 360 completes a circuit for relays 330, 350 and 335. The circuit for relay 330 may be traced from ground at contacts 368, contacts 312, 321 and through the winding of relay 330 to battery, but since relay 330 is constructed as being slow to operate, the relay will not operate during the present cycle of operations as its energizing circuit will be subsequently opened. The circuit for relay 350 may be traced from ground at contacts 368, contacts 312 and 311 up and to the right and down through the winding of relay 350 to battery. The circuit for relay 335 may be traced from ground at contacts 368, contacts 312 and 311, up and to the left through resistance R7 and through the winding of relay 335 to battery. At contacts 369, relay 360 completes its own locking circuit to switch-hook springs 402, at contacts 370, a point is opened in an alternate path of the high potential charging circuit for condenser C2 and the plate and grid supply to tube 305, and at contacts 371, the audible signalling circuit to the mobile subscriber is opened. The closing of contacts 363, which completes the incoming talking circuit to the handset 403, also makes it possible for the mobile subscriber to receive dial tone.

In operating contacts 326, relay 325 starts the operation of dynamotor 375, which provides power for the radio transmitter 301 and handset 403. In operating contacts 352, relay 350 changes the plate circuit of tube 305 to operate as a tone oscillator, at contacts 354 a point in the oscillator output of tube 305 is prepared for subsequent impulse transmission, at contacts 355 the cathode of tube 305 is grounded to prepare a further point in the plate circuit of tube 305 and at contacts 356 the plate supply of tube 305 and the charging circuit for condenser C2 is completed. The last mentioned circuits may be traced from the high positive potential in radio receiver 300, conductor 349, contacts 356, conductor 395, contacts 455, and divided, (1) by way of conductor 394, resistor R6 and contacts 365 to the left-hand plate of condenser C2, (2) by way of conductor 389, lower left-hand winding of transformer 383, contacts 352 and to the plate of tube 305. The right-hand plate of condenser C2 is connected to ground. In operating contacts 336 and 337, relay 335 disconnects the antenna from radio receiver 300 and connects the antenna with radio transmitter 301, which thereby places the transmitter on the air.

In summation, it will be noted that as relay 360 operated, the above described results for all practical purposes occurred almost simultaneously, in which a discharge circuit from condenser C4 was completed for stopping tube 306 from passing current to thereby release relay 320; relay 325 was operated for energizing radio transmitter 301; relay 335 was operated to disconnect the antenna from the radio receiver 300 and to connect the antenna with the transmitter 301 for placing the transmitter on the air; and relay 350 was operated to change tube 305 for operation as a tone oscillator during impulsing, with relay 350 also completing the high potential voltage supply for tube 305 and for charging condenser C2. To further describe the operation of condenser C4, it will be seen that as the discharge circuit of condenser C4 was completed, the discharge of condenser C4 caused a change in the grid bias of tube 306 which then ceased passing current and which in turn caused relay 320 to restore. Resistance R4 has been given a value which limits the discharge time of condenser C4 to approximately two seconds, therefore, at the end of the two seconds condenser C4 is completely discharged and tube 306 will again pass current to reoperate relay 320. In restoring, relay 320 opens the energizing circuit of the slow-to-operate relay 330 before relay 330 has operated.

From the foregone description it will be seen that as soon as relays 325 and 335 have operated, the mobile station's carrier is placed on the air. The mobile station's carrier remains on the air until after condenser C4 has discharged and tube 306 has again started passing current, at which time relay 320 is reoperated and again completes the circuit for relay 330 at contacts 321. After the expiration of its slow-to-operate time, relay 330 operates contacts 332 and applies battery potential directly to both sides of relay 335, which serves as a shunt and causes relay 335 to restore. The restoring of relay 335 removes transmitter 301 from the air by disconnecting the antenna from transmitter 301 and reconnecting the antenna with radio receiver 300.

Assuming for the instant that the radio station is busy or in use, an outgoing carrier transmitted from the radio station would be received at each mobile station's radio receiver such as 300 and cause the operation of each mobile station's squelch relay such as 310. In operating contacts such as 311 through 316, the operation of each relay such as 310 would prevent the operation of each relay such as 360 which in turn would prevent a future calling mobile station's carrier from being placed on the air. Also as an added busy indication, if a call had been extended via the radio station to one of the movile stations, all the minor switches such as 405 in all the pulse receivers of all other mobile stations would be operated and the relays such as 450 would be operated responsive to a different first or second digit for closing a circuit to light all busy lamps such as L—8. It is thought that this paragraph will suffice for the present description, since a more detailed explanation will follow in the section entitled "Incoming Call To Mobile Subscriber." However, since it has been previously described that the calling mobile station's carrier has been placed on the air, the radio station is therefore not busy.

During the time that the mobile station's carrier was on the air (approximately two seconds), the outgoing carrier was received at the radio control station and operated equipment therein such as described in the section entitled "Incoming Call (Mobile Subscriber Via Fixed Station to Exchange Subscriber)" for causing a trunk line to be seized at the central office. Responsive to said seizure, an acknowledged carrier is placed on the air by the radio control station for operating all the squelch relays such as 310 in all the mobile stations (with the exception of the calling mobile station at the present) for the purpose of locking out all the mobile stations but the calling one.

When relay 335 has restored responsive to the expiration of the discharge time for condenser C4, the antenna is returned to radio receiver 300 as previously stated. The radio station's carrier is received at the calling mobile station and causes a ground potential to be placed on conductor 348 for completing an obvious circuit to the squelch relay 310. In operating contacts 311 and 312, relay 310 opens the circuits to relays 330 and 350. At contacts 313, relay 310 completes an obvious locking circuit for itself, at contacts 315 a point in the original energizing circuit of relay 360 is opened, and at contacts 316 a point in the circuit for supplying an operating ground to the minor switch 405 is prepared, in addition, a point in the circuit of buzzer 407 is also prepared.

In restoring, relay 330 removes the battery shunt from relay 335 at contacts 332. Relay 350 will now restore, having no effect on the equipment at the present other than to conserve the potential of battery 409, since each subsequent depression of talk-listen button 415 and each rotation of dial 404 will complete a reenergizing circuit for relay 350.

The incoming carrier from the radio station causes the radio receiver 300 to transmit an audio frequency to the handset 403, and which serves as a dial tone indication to the mobile subscriber that he may now dial the desired call number. As soon as the dial is rotated for the first digit, the dial off-normal springs ON are closed, again completing a circuit for the relay 350, which may be traced from ground at the switch hook springs 402, through the dial off-normal springs ON, conductor 393 and through the winding of relay 350 to battery. It will be noted that the operation of relay 350 again completes the previously described circuits for the tube 305 to operate as a tone oscillator. As the dial 404 is allowed to restore, intermittent ground pulses, caused by the interrupter springs of the dial, operates the relay 420 once for each pulse. At the pulsing contacts 422, relay 420 applies dial pulses in the form of tone splashes (3,000 cycle voltage from the tone oscillator 305) to the radio transmitter 301. These tone splashes may be traced from the secondary winding of transformer 383, contacts 354, resistor R—9, conductor 387, contacts 422, conductor 385 and to the input winding of the transformer in the radio transmitter 301 where these tone splashes modulate the carrier. It will be also noted that as the dial 404 is rotated off normal, a circuit is completed for operating relay 335 in the radio transmitter 301. This circuit may be traced from ground at the switch hook springs 402, dial off-normal springs ON conductor 393, up to conductor 391, to the left through resister R—7 and through the winding of relay 335 to battery. Thus it will be seen that relay 335 will operate at the beginning of each digit dialed and then restore after each digit is dialed. Relay 335, therefore, operates at the same time as relay 350 and again connects the transmitter 301 with the antenna for placing the mobile station's carrier, modulated with the tone splashes corresponding to dial pulses, on the air. After the dial 404 has returned to normal at the end of the first digit dialed, relays 350 and 335 are released responsive to the opening of the dial off-normal springs ON.

The dialing of a second digit of the called number, operates the equipment in the same manner as described during the dialing of the first digit, with relays 350 and 335 operating as soon as dial 404 is rotated off-normal, and relay 420 operating responsive to each pulse of the dial. Upon completion of dialing, relays 350 and 335 again restore, with the antenna returned to the receiver 300.

The radio control station equipment receives the mobile station's carrier, which is modulated with the aforementioned splashes of tone, and detects these splashes and sends corresponding switch-controlling pulses to the automatic exchange, wherein they are transmitted over a seized link to operate automatic switches to connect with the called party. The ringing of the called party is completed in the usual manner. The called party answers the call by removing his receiver and the mobile subscriber hears his voice via the radio receiver 300 and the lines connected with his handset 403. Conversation may now proceed in the usual manner, with the mobile subscriber depressing the talk-listen button 415 in handset 403 during talking and releasing the button while listening.

Upon completion of conversation, the called subscriber replaces his receiver and releases the connection between the automatic exchange and the radio control station. When the mobile subscriber replaces his handset 403 the circuit is opened to relay 360 by the opening of switch hook springs 402. Upon restoring, relay 360 opens the locking circuit of squelch relay 310 at contacts 368, and at contacts 364 completes a "kick" discharge circuit for the previously charged condenser C2, which now discharges through resistor R5 to operate relay 340. In operating "X" contacts 343, relay 340 completes its own obvious locking circuit through contacts 331, at contacts 341, a circuit is completed for relay 420, which may be traced from ground at contacts 341, conductor 392, and up through the winding of relay 420 to battery. At contacts 347, relay 340 maintains relay 325 operated, thereby keeping transmitter 301 energized, since the restoring of relay 360 has opened the previous energizing circuit of transmitter 301 at contacts 361. At contacts 342, relay 340 completes an obvious circuit for the relays 350 and 335. At contacts 344 relay 340 completes a discharge circuit of the previously charged condenser C3 over a path similar to the one traced for condenser C4, and at contacts 346 a circuit is completed for the slow to operate relay 330, which at the present does not operate.

Relay 310 restores, having no effect on the equipment at the present. In operating, relay 335 functions as previously described to disconnect the antenna from the receiver 300 and connect the antenna with the transmitter 301. In operating, relay 350 functions as previously described, in which the circuits of tube 305 have been changed for causing the tube to operate as a tone oscillator. In operating contacts 422, relay 420 completes the output circuit of tube 305 so that now the tone oscillations of approximately 3000 cycles are modulated with the mobile station's carrier over a circuit which may be traced from the right-hand winding of transformer 383, contacts 354, resistance R9, conductor 422, conductor 385 and to the input transformer in the radio transmitter 301 where the carrier with its tone modulation is placed on the air.

However, at the time that the circuits for relays 420, 350 and 335 were completed, the discharge circuit for condenser C3 was completed. The discharge of condenser C3 has the same effect on tube 306 as was previously described for condenser C4, so that it will be seen that tube 306 will cease passing current while condenser C3 is discharging and relay 320 will therefore restore. In restoring, at contacts 321, relay 320 opens the energizing circuit of the slow-to-operate relay 330, which has no effect since relay 330 had not yet operated.

During the time that condenser C3 is discharging, tube 306 does not pass current and relay 320 is therefore restored, also, the mobile station's carrier is modulated with the tone oscillations from tube 305 and placed on the air. After a predetermined interval of time (slightly less than two seconds), condenser C3 completely discharges, tube 306 again passes current and relay 320 reoperates. The operation of relay 320 completes the circuit to relay 330 which will operate over an obvious circuit after the expiration of its slow-to-operate time and open the locking circuit of relay 340 at contacts 331. At contacts 332, relay 330 applies battery potential for shunting down relay 335 over an obvious circuit.

In restoring relay 340 opens the circuit to relay 325 in transmitter 301 at contacts 347, at contacts 341, the circuit to relay 420 is opened, at contacts 342 the energizing circuit to relays 335 and 350 are opened, at contacts 343, its own locking circuit is opened, at contacts 344, the discharge circuit for condenser C3 is opened, at contacts 345, the charging circuit for condenser C3 is completed and at contacts 346 the energizing circuit for relay 330 is opened.

As relay 335 restores, the antenna is transferred from the transmitter 301 to the receiver 300 and the mobile station's modulated carrier is removed from the air. When relay 325 restores, the transmitter 301 is deenergized. In restoring its operated contacts, relay 350 changes the circuits of tube 305 for operation as a tone detector. In restoring its operated contacts, relay 420 opens the output circuit from the tone oscillator and connects the transmitter of the handset 403 with the radio transmitter 301.

Since the battery shunt applied to the winding of relay 335 by relay 330 will tend to make relay 335 slow-to-release, the actual release of relay 335 becomes effective after relay 340 has restored and at approximately the same time that relays 350 and 420 restore. Therefore, under average conditions the mobile station's modulated carrier will be placed on the air for approximately two seconds which broadly represents the sum of the discharge time of condenser C3, plus the operating time of relay 330, plus the release time of relay 335. It will be remembered that the duration of this time period may be changed by varying the value of resistance R4, which directly affects the discharge time of condensers C3 and C4.

The mobile station's carrier modulated with the uninterrupted tone oscillation is received at the radio station for initiating the release of the radio station equipment, and since this uninterrupted tone oscillation lasts for approximately two seconds, which is of a much longer duration than the dial pulses, it may effectively be termed as a release pulse.

The mobile station equipment may now be considered at normal and conditioned to handle future calls since tube 306 is passing current and relay 320 is operated, all other relays have restored, tube 305 is conditioned to operate as a tone detector and the antenna is connected with the radio receiver 300.

*Incoming call to mobile subscriber*

The operation of the mobile equipment during the origination and completion of an incoming call from the radio station will now be explained, reference being had with Figs. 3 and 4. It will be assumed that the mobile subscriber has energized his equipment by the operation of his master switch 408 as previously described in the section entitled "Outgoing Call From Mobile Subscriber."

Responsive to the incoming carrier from the fixed, or radio station, a ground potential is applied to conductor 348, from radio receiver 300, for operating squelch relay 310. In operating contacts 313, squelch relay 310 prepares its own locking circuit. At contacts 314 squelch relay 310 completes the plate circuit for tube 305 to operate as a tone detector. This circuit may be traced from the positive high voltage source in radio receiver 300, conductor 349, contacts 314, 370, conductor 395, contacts 455, winding of relay 410, conductor 386, contacts 351 and to the plate of tube 305. At contacts 315, the squelch relays 310 at all of the mobile stations opens the original energizing circuits to relays, such as relay 360, to lock out all mobile stations except the called mobile station as will be more fully described hereinafter, and at contacts 316 a point in the operating circuit for the relays and magnets of the minor switch 405 is prepared.

The calling subscriber now dials the call number of the desired mobile station to cause the radio station to modulate its carrier with splashes of tone corresponding to the number of impulses in the call number as previously described.

The incoming modulated carrier is received at radio receiver 300 and from there the splashes of tone are applied to the right-hand winding of transformer 383 over a circuit from the output winding of the transformer in the radio receiver 300, contacts 352 and 353. From the left-hand winding of transformer 383 these splashes are applied to the grid of the tube 305. Tube 305 rectifies each incoming splash of tone and completes a circuit upon each splash for operating pulsing relay 410. This circuit may be traced from the plate of tube 305, contacts 351, conductor 386, through the winding of relay 410, contacts 455, conductor 395, contacts 370, 314, conductor 349 to high positive battery potential in radio receiver 300.

Upon recepit of the first incoming of the first digit from the radio station, relay 410 operates and at contacts 411 completes a circuit to relay 440 and at contacts 412 completes a circuit to motor magnet 430. These circuits may be traced from their respective batteries through the respective windings of relay 440 and motor magnet 430, contacts 411 and 412, contacts 454, 473, conductor 398 and contacts 316 to ground.

Before continuing with the present explanation, it will be assumed that the calling party is placing a call to the mobile subscriber shown in Figs. 3 and 4, in which the connections on the minor switch bank 405 indicate that the illustrated mobile subscriber's call number is the two digit number "47." Relay 410 will therefore operate and deenergize four times each, upon receipt of the pulses of the first digit dialed. Relay 440 is constructed as being slow-to-release and will remain operated during the pulsing of each digit but will release between digits.

In operating contacts 441, relay 440 removes a ground potential from the wiper 406 of the minor switch 405 while stepping. Motor magnet 430 operates responsive to each operation of relay 410 and restores responsive to each release of the relay 410 and advances wiper 406 one step upon each release. Off-normal springs ON close on the first step of wiper 406 to prepare a circuit for release magnet 435. Since the pulses of the first incoming digit "4" operated relay 410 and motor magnet 430 four times each, it will be seen that the wiper 406 now is resting on the fourth contact of the contact bank.

The pulsing has now ceased for the first digit and relay 440 restores. At contacts 441, relay 440 completes a circuit for the relay, such as 460, at all mobile stations having the digit "4" for the first digit of their call number. This circuit may be traced from ground at contacts such as 316, conductor such as 398, up through contacts such as 441, wiper such as 406 and its engaged fourth contact, contacts such as 462 and through the winding of relay such as 460 to battery.

In closing contacts 461, relay 460 also completes a circuit to the release magnet 435, which may be traced from ground at contacts 316, conductor 398, contacts 441, 461, off-normal contacts ON and through the winding of release magnet 435 to battery. At "X" contacts 465, relay 460 first completes its own locking circuit, which may be traced from ground at contacts 316, conductor 398, contacts 473, 454, 465 and through the winding of relay 460 to battery. At contacts 462, relay 460 opens its previous energizing circuit and at contacts 464 prepares an operating circuit for relay 470.

The operation of release magnet 435 restores wiper 406 to normal in the usual manner and opens off-normal springs ON to open its own circuit.

The last digit "7" of the call number "47" is now dialed, with relay 410 and motor magnet 430 operating a corresponding number of times. At the end of the last series of incoming pulses, it will be seen that wiper 406 is now at rest on the seventh contact of the contact bank. Relay 440, which operated at the beginning of the pulses of the last digit, now restores and at contacts 441 completes a circuit for energizing relay 410, this circuit may be traced from the ground at contacts 316, conductor 398, contacts 441, wiper 406 and its engaged seventh bank contact, contacts 464 and through the winding of relay 470 to battery.

In operating "X" contacts 472, relay 470 first completes its own locking circuit, and since the off-normal springs ON have again been closed, at contacts 471 completes a circuit to the release magnet 435. At contacts 473 the locking circuit to relay 460 is opened, at contacts 474, an operating circuit for relay 360 is prepared and at contacts 475 a signalling circuit is completed by way of contacts 371 and 316 to buzzer 407 to indicate to the mobile subscriber that he is being called on an incoming call. Relay 460 now restores and release magnet 435 operates to restore wiper 406 again to normal, at which time the off-normal springs ON open to restore the release magnet 435.

Responsive to the audible signal from buzzer 407, the mobile subscriber now removes his handset 403, which closes the switch-hook springs 402 and completes a circuit to relay 360. This circuit may be traced from ground at switch-hook springs 402, contacts 474, conductor 396 and through the winding of relay 360 to battery.

It will be understood that at all the mobile stations, the contacts such as 315 are opened by the squelch relays such as 310 so that such subscribers cannot operate relays such as 360 to originate an outgoing call. Since the relay 470 at only the called mobile station is operated to close contacts 474 to prepare an alternate circuit for relay 360, it will be seen that only the called station can operate relay 360 over this alternate circuit by the removal of the handset, all other stations being locked out by their inability to complete an operating circuit for their relays such as 360.

In operating contacts 361, relay 360 completes an obvious circuit to relay 325 in radio transmitter 301, at contacts 363 a point in the talking circuit between radio receiver 300 and handset 403 is completed, at contacts 365 a point in the charging circuit for the condenser C2 is prepared and at contacts 367 the discharge circuit for condenser C4, which became charged over a previously traced circuit is completed. Condenser C4 discharges to cause tube 306 to cease passing current and thereby release relay 320, all of which has been previously described in the section entitled "Outgoing Call From Mobile Subscriber," and since this operation performs no useful function at this time, it is thought that the present description will suffice. At contacts 368 relay 360 completes an obvious holding circuit for the squelch relay 310, at contacts 369 completes its own locking circuit, at contacts 370 the high voltage circuit from the radio receiver 300 is opened to prevent charging of condenser C2, and at contacts 371 opens the audible signalling circuit of the buzzer 407.

In operating contacts 326, relay 325 completes the circuit for starting dynamotor 375, which provides the operating power for radio transmitter 301 and the handset 403.

Conversation may now take place in the usual manner, with the mobile subscriber depressing his talk-listen button 415 to speak and releasing the button to listen. The operation of the talk-listen button 415 closes previously traced circuits for operating relays 335 and 350. The operation and release of relay 335 takes place each time that the talk-listen button 415 is depressed or released and alternately connects and disconnects the radio transmitter 301 and receiver 300 with the antenna as previously described. The operation of relay 350 has been fully described in the section entitled "Outgoing Call From Mobile Subscriber," in which relay 350 completes a previously traced charging circuit for the condenser C2 and the other functions as previously mentioned.

Responsive to the completion of conversation, the calling subscriber replaces his receiver to restore the exchange equipment as previously described, and when the mobile subscriber replaces his handset 403 on the switch hook, springs 402 open the circuit to relay 360 then restores and at contacts 361 opens the circuit to relay 325. At contacts 364, relay 360 completes a previously traced discharge circuit for the condenser C2, which upon discharging energizes the relay 340, and at contacts 366 completes a previously traced circuit for recharging condenser C4.

The sequence of operations following the energization of relay 340 has been described in the section entitled "Outgoing Call From Mobile Subscriber," hence, it is deemed unnecessary to repeat the same in detail and instead will be briefly outlined.

In operating, as previously described, relay 340 completes its own locking circuit, completes circuits for relays 420, 350 and 335, maintains relay 325 operated, completes the discharge circuit of condenser C3 and completes a circuit for the slow-to-operate relay 330.

In operating, relay 350 completes the plate circuits of tube 305 to operate as a tone oscillator, and since the antenna has been switched to the radio transmitter 301 and relay 420 is operated, the mobile station's carrier is modulated by the uninterrupted tone oscillation from tube 305 and placed on the air. In the meantime, condenser C3 has started discharging over a previously traced circuit and caused tube 306 to cease passing current which thereby allows relay 320 to restore. The restoring of relay 320 opens the circuit to relay 330 before that relay has had time to operate. The mobile station's modulated carrier will remain on the air during the discharging of condenser C3 and for a short interval thereafter.

When condenser C3 has completed discharging, tube 306 again passes current and relay 320 is reoperated. In operating, relay 320 completes the circuit to relay 330, which will operate after a normal interval of time. Relay 330 opens the circuit to relay 340 and also applies a previously mentioned battery shunt to the relay 335. In restoring, relay 340 opens the circuit to relays 350, 330 and 420, and completes the charging circuit for condenser C3. In restoring, relay 335 removes the mobile stations modulated carrier from the air by disconnecting the antenna from the transmitter 301 and connecting the antenna with the receiver 300. Relay 330 now restores with no apparent effect, since the previous energizing circuit of relay 335 has been opened by relay 340. Relays 350 and 420 likewise restore.

During the time that the mobile station's modulated carrier was on the air, it was received at the radio station for initiating the release of the radio station equipment.

The restoration of the mobile station equipment has now been covered, references being had with the aforementioned section entitled "Outgoing Call From Mobile Subscriber." All of the mobile station equipment is restored, however, it has not been explained how and when the squelch relay 310 and the last digit control relay 470 restored. It will be remembered that when relay 360 restored, the locking circuit to the relay 310 was removed and that relay 310 will remain operated as long as the mobile station receives the radio station's carrier. Therefore, when relay 335 operated, responsive to the operation of relay 340, the antenna was removed from the receiver 300 and connected with the transmitter 301 so that the mobile station now fails to receive the radio station's carrier. Relay 310 thereby restores and opens the circuit to relay 470 at contact 316. If, at the end of the transmission of the release pulse when the antenna is returned to the radio receiver 300 and the radio station hasn't completely restored to normal, the radio station's carrier is still on the air, relay 310 may momentarily energize until the radio station's carrier goes off the air.

The mobile station equipment may now be considered at normal and conditioned to handle future calls since tube 306 is passing current and relay 320 is operated, all other relays have restored, tube 305 is conditioned to operate as a tone detector and the antenna is connected with the radio receiver 300.

Before continuing with the present explanation, a short description will follow concerning the operations of the pulse receivers in the other mobile stations when the call number "47" of the called mobile station is dialed.

When the first digit "4" is dialed, all the pulse receivers in the other mobile stations operate as just described for the called station. All the wipers such as 406 are engaged with their respective fourth contacts of the minor switches contact bank. At this time a previously traced circuit is completed, at the stations whose first digit corresponds with the digit "4," for operating their first digit control relays such as 460. At the remaining of the other stations whose first digit does not correspond with the digit "4," the fourth contact of the contact bank is connected in multiple with the other contacts of the contact bank that do not correspond with the individual station's call number and a circuit is completed for their lock-out relays such as 450 over circuit which may be traced from ground at contacts such as 316, conductor such as 398, up through contact such as 441, wiper such as 406 and its engaged fourth contact, the multipled connection and through the winding of relay 450 to battery. In operating, all relays such as 450 lock operated to the ground at contacts such as 316 by way of their "X" contacts such as 453. At "X" contacts such as 454, the relays such as 450 remove the operating ground for the motor magnets and relays of the pulse receivers, at contacts such as 451 a previously traced circuit for the release magnet such as 435 is completed, at contacts such as 452 a circuit is completed for lighting all busy lamps such as L8 and at contacts such as 455 the pulsing circuits to relays such as 410 are opened.

Thus it will be seen that after the first digit has been received at the mobile stations, all stations whose first digit of their call number does not correspond with the digit dialed will be locked out and their pulse receivers will be inoperative for the remainder of the dialing and during the time the connection is maintained. Only the pulse receivers of the stations whose first digit corresponds with the first digit dialed remain operative.

The last digit "7" is now dialed and at only the called station, whose contact bank is wired accordingly, will a previously traced circuit be completed to the last digit control relay 470 for signalling the mobile subscriber. At the remainder of the mobile stations, since the seventh contacts of their contact banks are connected in multiple with the other contacts not corresponding to their individual call number, a previously traced circuit is completed to their lock-out relays such as 450. The operation of relays such as 450 maintain the remaining mobile stations, whose first digit corresponds to the number "4" of the first digit dialed but whose second digits do not correspond to the number "7" of the last digit dialed, locked out during the time the connection lasts.

It will be remembered that the digit "1" is not used as either a first digit or second digit of any of the mobile stations call numbers, since a false pulse may sometimes occur due to a burst of static or interference and cause the pulse receiver to step erroneously. Therefore the first contact of each of the contact banks has been connected through the off-normal springs ON to the release magnet 435. Thus, if a false pulse occurs, the minor switch will step one step, the off-normal springs ON will close and a circuit is completed to the release magnet 435 for restoring the switch to normal.

*Minor switch using three-digit call numbers*

Figure 5:
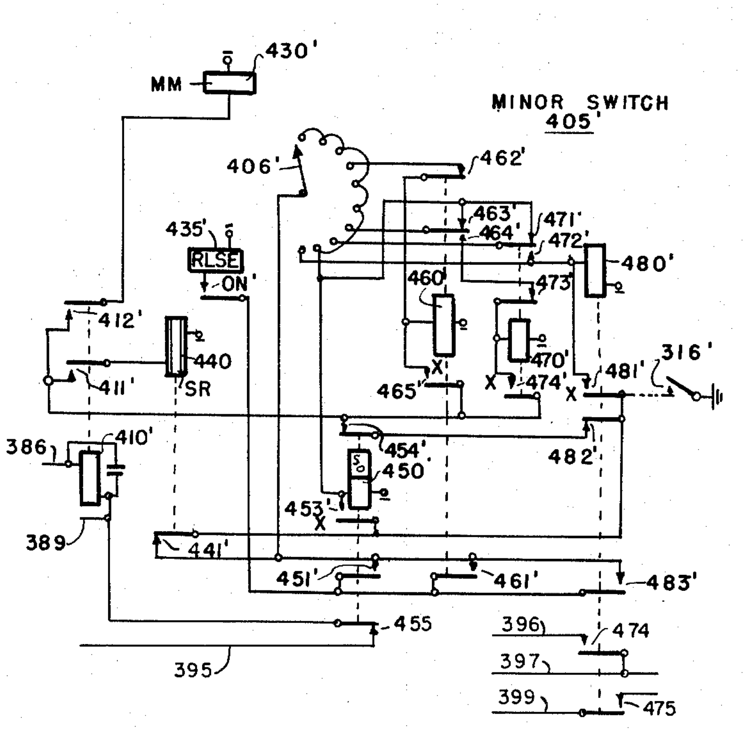
Figure 5 shows a modification of a minor switch which may be substituted for the minor switch 405 in the pulse receiver shown in Fig. 4.

The operation of the minor switch shown in Figure 5 will now be explained. Since relay 450′ controls circuits similar to that of relay 450 (Fig. 4), and relay 480′ controls circuits similar to that of relay 470, it is believed unnecessary to describe in detail the circuits controlled by these relays and only the circuits for operating these relays will be described. All the reference numbers have been given primes to correspond in part to the same number used to identify similar parts shown in the minor switch of Figure 4.

By removing minor switch 405 from Figure 4 and inserting minor switch 405′ (Figure 5) into its place, it will be seen that relay 450′ will also control contacts 452 and 455, and relay 480′ will control contacts 474 and 475.

Assuming that the contact bank of minor switch 405′ is wired as shown, the call number of this particular mobile station will be the three digit call number "478." It will be noted that relay 410' compares with the relay 410 (Figure 4) and that it is operated as previously described in the section entitled "Incoming Call To Mobile Subscriber," in which the incoming dial pulses are rectified by the tone detector of tube 305, with the rectified pulses operating relay 410'. It will also be noted that the control ground at contacts 316' is the same as that applied at contacts 316 (Figure 3) responsive to the operation of relay 310.

Before continuing with the present description, it will be assumed that minor switch 405' has been substituted in place of minor switch 405; that an incoming call to the mobile station, corresponding with the call number "478," has been initiated: and that the mobile equipment has operated as described in the previously mentioned section up to the point at which the first digit is received.

Assuming now that the first digit dialed is the number "4" of the call number "478." Four rectified pulses are transmitted by the tone detector of tube 305 for completing a circuit to relay 410', which operates upon receipt of each pulse and restores between pulses. In operating, relay 410' completes a circuit to the relay 440' at contacts 411', and it contacts 412, completes a circuit to motor magnet 430'. Since relay 440' has been constructed as being slow-to-release, it will operate as soon as contacts 411' are closed and remain operated during pulsing of relay 410', and release between each dialed digit. Motor magnet 430' operates as soon as contacts 412' close and releases as soon as contacts 412' open. The operating circuits for relay 440' and motor magnet 440' may be traced from ground at contacts 316', contacts 482', 454', 411' and 412', and through the windings of relay 440' and magnet 430' to battery, respectively. This interaction between motor magnet 430' and relay 410' continues until each series of pulses ends.

Upon each restoration of motor magnet 430', wiper 406', is advanced one step and thus it will be seen that at the end of the first series of pulses, wiper 406' will rest on the fourth contact of the contact bank. Responsive to wiper 406' engaging with the fourth contact of its contact bank, a circuit is completed for operating relay 460'. The first operation of relay 440' had removed ground from wiper 406' by opening contacts 441', however, at the end of the first series of pulses, relay 440' restored and reconnected the ground potential to wiper 406' by closing contacts 441'. The circuit for relay 460' may be traced from ground at contacts 316', contacts 441', wiper 406' and its associated fourth contact, contacts 462' and through the winding of relay 460' to battery.

In operating "X" contacts 465', relay 460' completes its own locking circuit over an obvious path before opening its original energizing circuit at contacts 462', at contacts 464' prepares a circuit for relay 470', and at contacts 461' completes a circuit to the release magnet 435'. Since off-normal springs ON' were closed responsive to wiper 406' stepping off normal, the circuit for magnet 435' may be traced from ground at contacts 316', contacts 441', 461', off-normal springs ON' and through the winding of magnet 435' to battery. Release magnet 435' now restores wiper 460' to normal.

The second digit "7" is now dialed and relay 410', magnet 430' and relay 440' operate in the same manner as described for the first digit, with wiper 406' finally stopping on the seventh contact of the contact bank, at the end of the pulsing cycle. At this time, relays 410' and 440' and magnet 430' will have restored and the ground potential is reconnected to wiper 406', thus completing a circuit for relay 470'. This circuit may be traced from the ground on wiper 406' and its engaged seventh contact, contacts 464', 473', and through the winding of relay 470' to battery. In operating "X" contacts 474', relay 470' completes its own locking circuit over a similar path as that for relay 460' before opening its energizing circuit at contacts 473', and at contacts 472' prepares a circuit for relay 480'.

Since relay 460' is still operated and relay 440' has restored due to the end of the second series of pulses, a circuit is again completed for release magnet 430', which restores wiper 406' to normal for a second time.

The last digit "8" of the call number is now dialed and relays 410' and 440' and magnet 430' again operate as previously described, with wiper 406' engaging the eighth contact of the contact bank at the end of the last series of pulses. At this time, a circuit is completed for relay 480' which may be traced from ground on wiper 406' and its engaged eighth contact, contacts 472' and through the winding of relay 480' to battery. In operating "X" contacts 481', relay 480' completes its own locking circuit to the ground at contacts 316'. At contacts 482' relay 480' opens the locking circuits of relay 460' and 470' and they restore. At contacts 483', relay 480' prepares a circuit for the release magnet 435' so that when relay 440' restores, the circuit for energizing magnet 435' is then completed for returning wiper 406' to normal. The operation of relay 480' also closes contacts 474 and 475 which respectively prepares a circuit for operating relay 360 (Figure 4) and for signalling the mobile subscriber of an incoming call in the same manner as described for Figure 4.

A general call feature is also provided in this switch, in which all the mobile subscribers may be signalled simultaneously by the central office in response to the dialing of a single digit "0." Relay 480' is operated in the same manner as relay 470 (Figure 4), which has been described in the previous section entitled "Incoming Call To Mobile Subscriber," and which operates to signal all the subscribers by closure of contacts 475.

It will be understood that if a call number is dialed, in which one of the digits does not correspond with the illustrated subscribers call number, the relay 450' will operate responsive to receipt of the different digit to halt any subsequent operation of the minor switch and lock out the mobile subscriber until the call is terminated or abandoned.

Having described the invention, what is considered new and desired to have protected by Letters Patent will be pointed out in the appended claims.

What is claimed is:

1. In a mobile radio telephone system, a radio control station, mobile stations, means responsive to the initiation of a call by a calling one of said mobile stations for transmitting a mobile radio frequency carrier on the air, means in said control station operated responsive to the receipt of said transmitted mobile carrier for transmitting a control station radio frequency carrier on the air, locking means operated in response to the operation of said control station transmitting means for maintaining said control station transmitting means in operated condition to maintain said control station carrier on the air, means responsive to the severance of said call by the calling mobile station for transmitting a modulated mobile carrier release pulse of predetermined duration, and means in said control station operated only in response to the receipt of said modulated mobile carrier pulse of said predetermined duration for releasing said locking means to remove said control station carrier from the air.

2. In a mobile radio telephone system, a radio control station, mobile stations, means responsive to the initiation of call by a calling one of said mobile stations for transmitting a mobile radio frequency carrier on the air, means in said control station operated responsive to the receipt of said transmitted mobile carrier for transmitting a control station radio frequency carrier on the air, locking means operated in response to the operation of said control station transmitting means for maintaining said control station transmitting means in operated condition to maintain said control station carrier on the air, impulse transmitting means in said calling mobile station for transmitting modulated pulses of said mobile carrier to extend a desired connection, means responsive to the severance of said call by the calling mobile station for transmitting a modulated mobile carrier release pulse of predetermined duration, and means in said control station operated only in response to the receipt of said modulated mobile carrier pulse of said predetermined duration for releasing said locking means to remove said control station carrier from the air.

3. In a mobile radio telephone system, a radio control station, mobile stations, means responsive to the initiation of a call by a calling one of said mobile stations for transmitting a mobile radio frequency carrier on the air, a squelch relay in said control station operated in response to the receipt of said transmitted mobile carrier, means in said control station responsive to the operation of said relay for transmitting a control station radio frequency carrier on the air, locking means operated in response to the operation of said relay for locking said relay in operated condition to maintain said control station carrier transmitting means in operation, means responsive to the severance of said call by the calling mobile station for transmitting a modulated mobile carrier release pulse of predetermined duration, means including a slow-to-operate relay in said control station operated only in response to the receipt of said modulated mobile carrier release pulse of said predetermined duration, and means controlled by the operation of said slow-to-operate relay for restoring said locking means to thereby restore said squelch relay and remove said control station carrier from the air.

4. In a mobile radio telephone system, a radio control station connected to an automatic telephone exchange having a plurality of fixed automatic subscriber stations connected thereto, mobile stations, means in said control station responsive to the initiation of a call by one of said fixed stations to a called one of said mobile stations for seizing said control station, a radio transmitter in said control station operative in response to said seizure for placing a control station radio frequency carrier on the air, means at said control station responsive to subsequent dial pulses received from said calling fixed station for modulating said control station carrier in accordance with said received pulses, means in said called mobile station operative in response to said control station modulated carrier pulses for selecting and signalling said called mobile station, means including a handset and a radio transmitter at said called mobile station for completing said connection over the air between said calling fixed station and said called mobile station, maintaining means in said control station operative for maintaining said control station carrier on the air during conversation and after said calling station disconnects from said connection, means at said called mobile station operative in response to the called subscriber replacing said handset for operating said called mobile radio transmitter to place a mobile radio frequency carrier on the air and for modulating said mobile carrier to transmit a modulated release pulse, and means in said control station operative only in response to said modulated release pulse for restoring said maintaining means to remove said control station carrier from the air.

5. A telephone system such as claimed in claim 4, including time delay equipment at said called mobile station operative responsive to the replacing of said handset by said called mobile station after a predetermined lapse of time for halting the transmission of said modulated release pulse and the transmission of said mobile carrier to thereby fully release said connection.

6. A telephone system such as claimed in claim 4, wherein said last means includes a detecting means operated responsive to receipt of said modulated release pulse for rectifying said pulse, and a relay operated responsive to said rectified pulse for initiating the restoration of said maintaining means.

7. In a telephone system for extending calls over a radio link between a first group of connected subscriber stations and a second group of isolated subscriber stations in response to dial pulses initiated by the calling subscriber; each of said isolated stations including a handset, a radio transmitter, an electronic discharge device and an antenna normally disconnected from said transmitter; means operated responsive to the removal of said handset by one of said isolated subscribers when calling for energizing said transmitter at the calling station, for connecting said transmitter with its antenna to place a radio frequency carrier on the air for seizing said control station; a radio control station, a dial at said calling station initially rotated by the calling subscriber subsequent to the removal of said handset, a first relay operated responsive to said initial rotation of said dial for preparing said electronic discharge device to operate as a tone oscillator, a second relay intermittently operated when said dial returns to normal for causing said electronic discharge device to transmit intermittent pulses of tone to modulate said carrier transmitted to said control station for extending said call, and means operated responsive to the restoration of said first means by said calling subscriber replacing said handset for reoperating said first relay to again prepare said electronic discharge device to operate as a tone oscillator and to operate said second relay for a predetermined interval of time for allowing said electronic discharge device to transmit a steady pulse of tone, corresponding to said interval of time, to modulate said carrier for initiating the release of said control station.

8. A telephone system such as claimed in claim 7, including an electronic timing arrangement, a circuit controlled responsive to the operation of said last means for initiating a current flow in said timing arrangement, and means controlled by the operation of said timing arrangement after a predetermined interval of time, corresponding to said current flow reaching a predetermined value, for restoring said last means to subsequently restore said first and second relays and thereby halt the transmission of said steady modulated tone pulse.

9. A telephone system such as claimed in claim 7, wherein said last means includes a relay and a condenser for energizing said relay, a circuit controlled by said first means for charging said condenser with a high potential, and another circuit including said charged condenser, controlled by said first means, for initiating the operation of said relay.

10. In a telephone system for extending calls over a radio link between a first group of connected subscriber stations and a second group of isolated subscriber stations in response to dial pulses initiated by the calling subscriber; a radio control station, a handset at each said isolated station having a normal position, a radio transmitter at each said isolated station, means operated by a calling one of said isolated stations responsive to the removal of said handset from normal for energizing said transmitter and placing said transmitter's radio frequency carrier on the air to seize said control station, an electronic timing device initially energized responsive to said first means operation to operate after a predetermined time interval for removing said transmitter's carrier from the air, and means operated responsive to the restoration of said first means, when said handset is replaced to normal, for replacing said transmitter's carrier on the air and for initiating and transmitting a timed release pulse to modulate said carrier transmitted to said seized control station for initiating release purposes thereat, said operation of said last means also initiating the reenergization of said timing device to reoperate after a predetermined time interval for restoring said last means to normal and thereby halt the transmission of said modulated release pulse and said carrier.

11. In a telephone system for extending calls over a radio link between a first group of connected subscriber stations and a second group of isolated subscriber stations in response to dial pulses initiated by the calling subscriber; a radio control station, means in said control station operated responsive to the initiation of a call by a calling one of said first group of subscribers for seizing said control station, a two-digit call number individual to each of said second group of isolated subscribers, means in said control station operated responsive to the dialing of a desired one of said two-digit call numbers by said calling subscriber for transmitting pulses corresponding to said dialed two-digits to each of said second group of isolated subscribers, means at each of said isolated subscriber stations for receiving said transmitted pulses, each said isolated subscriber station including an electronic discharge device for rectifying said received pulses, a pulsing relay operated responsive to receipt of said rectified pulses and a pulse receiver operated responsive to each operation of said relay, means at each of said isolated subscriber stations controlled responsive to the operation of each said pulse receiver for discriminating between incoming calls to said isolated subscriber stations and to thereafter signal the called subscriber at the station corresponding to said dialed two-digit call number of an incoming call and for signalling all other isolated subscriber stations that said radio control station is busy, and means at said called station operated responsive to the severance of said call by said called subscriber for transmitting a release pulse to said control station to initiate the release of said control station.

12. A telephone system such as claimed in claim 11, including a minor switch in each of said pulse receivers having a single contact bank and wiper, said wiper having access to said contact bank, a special call number comprised of one digit having a predetermined value, a certain contact on each of said contact banks corresponding to said special call number, and means operated at each of said isolated stations responsive to said wipers engaging said certain contacts, in response to said minor switch being operated upon receipt of pulses corresponding to said special call number, for completing a circuit to signal all of said isolated subscribers simultaneously.

13. In a radio telephone system, a radio control station having a radio receiver and a radio transmitter, a first relay in said station connected to said receiver and operated in response to the receipt of an incoming radio frequency carrier received by said receiver, means controlled by the operation of said first relay for activating said transmitter to transmit an outgoing radio frequency carrier over the air, a second relay, a first circuit for operating said second relay closed responsive to the operation of said first relay, a second circuit closed by the operation of said second relay for maintaining said first relay operated after termination of said incoming carrier, means including a third relay in said control station operated in response to the receipt of a modulated release pulse of said incoming carrier, normally closed contacts included in said first circuit operated by the operation of said third relay for opening said first circuit to restore said second relay, the restoration of said second relay opening said second circuit to restore said first relay after termination of said modulated carrier pulse, and the restoration of said first relay controlling said transmitting means to remove said outgoing carrier from the air.

14. A radio telephone system such as claimed in claim 13, wherein said last means includes an electronic tone detector operated responsive to the receipt of said modulated release pulse for detecting and rectifying said pulse, and a pulsing relay operated by said release pulse for operating said third relay.

15. A radio telephone system such as claimed in claim 13, wherein said third relay comprises a slow-to-operate relay and wherein said last means includes a pulsing relay controlled by modulated switch controlling impulses of said incoming carrier, and a circuit controlled by said pulsing relay normally ineffective to operate said third relay in response to said switch controlling impulses and effective only in response to said modulated release pulse of a predetermined duration.

16. In a radio telephone system, a mobile station having a radio transmitter, a condenser in said station charged during the time said station is included in a connection with another station, means for discharging said condenser in response to said station terminating said connection, a relay included in the discharge circuit of said condenser and operated by said discharge of said condenser, means for locking said relay operated, means controlled by the operation of said relay for activating said transmitter to transmit an outgoing radio frequency carrier over the air, other means controlled by the operation of said relay for modulating said outgoing carrier, and means including an electronic timing device in said station operated in response to the operation of said relay for releasing said relay after a predetermined interval to thereby terminate the transmission of said carrier and said modulations thereof after said predetermined interval.

ROBERT P. DIMMER.

REFERENCES CITED

The following references are of record in the file of this patent:

UNITED STATES PATENTS

| Number | Name | Date |
|---|---|---|
| 2,031,692 | Carson | Feb. 25, 1936 |
| 2,064,958 | Taylor | Dec. 22, 1936 |
| 2,129,332 | Mastini | Sept. 6, 1938 |
| 2,265,056 | Bowers | Dec. 2, 1941 |
| 2,407,150 | Gillings et al. | Sept. 3, 1946 |
| 2,469,555 | Hitchcock | May 10, 1949 |

FOREIGN PATENTS

| Number | Country | Date |
|---|---|---|
| 570,415 | Great Britain | July 5, 1945 |
| 576,845 | Great Britain | Apr. 23, 1946 |